(12) United States Patent
Sim et al.

(10) Patent No.: US 9,801,121 B2
(45) Date of Patent: Oct. 24, 2017

(54) ELECTRONIC DEVICE AND METHOD OF MANAGING BS LIST THEREOF

(71) Applicant: Samsung Electronics Co., Ltd., Gyeonggi-do (KR)

(72) Inventors: Jae-Kwang Sim, Gyeonggi-do (KR); Jun-Hui Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 23 days.

(21) Appl. No.: 14/806,251

(22) Filed: Jul. 22, 2015

(65) Prior Publication Data
US 2016/0029304 A1 Jan. 28, 2016

(30) Foreign Application Priority Data
Jul. 23, 2014 (KR) .......... 10-2014-0093459

(51) Int. Cl.
*H04W 36/00* (2009.01)
*H04W 48/16* (2009.01)

(52) U.S. Cl.
CPC .................. *H04W 48/16* (2013.01)

(58) Field of Classification Search
CPC ... H04W 84/045; H04W 88/06; H04W 84/18; H04W 4/008; H04W 72/0406
USPC ......................... 455/443, 41.2, 444
See application file for complete search history.

(56) References Cited

U.S. PATENT DOCUMENTS

| | | | | |
|---|---|---|---|---|
| 2012/0315905 | A1* | 12/2012 | Zhu | H04W 36/36 455/436 |
| 2015/0038151 | A1* | 2/2015 | Dalsgaard | H04W 36/0083 455/444 |
| 2015/0359034 | A1* | 12/2015 | Kim | H04W 76/048 370/328 |

* cited by examiner

*Primary Examiner* — Tu X Nguyen
(74) *Attorney, Agent, or Firm* — The Farrell Law Firm, P.C.

(57) ABSTRACT

A method and device for managing a Base Station (BS) list by a first electronic device. The method includes transmitting the BS list to a second electronic device connected to the first electronic device via short-range communication; determining whether a preset time lapses from the transmission of the BS list; updating the BS list when the preset time lapses; and transmitting the updated BS list to the second electronic device. The device includes a communication module configured to transmit the BS list to a second electronic device connected to the first electronic device via short-range communication; and a list management module configured to determine whether a preset time lapses from the transmission of the BS list, update the BS list when the preset time lapses, and control the communication module to transmit the updated BS list to the second electronic device.

10 Claims, 11 Drawing Sheets

ELECTRONIC DEVICE AND METHOD OF MANAGING BS LIST THEREOF

CROSS-REFERENCE TO RELATED APPLICATION(S)

This application claims priority under 35 U.S.C. §119(a) to a Korean Patent Application filed on Jul. 23, 2014 in the Korean Intellectual Property Office and assigned Serial No. 10-2014-0093459, the entire contents of which are incorporated herein by reference.

TECHNICAL FIELD

The present disclosure relates to an electronic device used as a host device or a companion device interworking with the host device, and a method of managing a BS list which the host device transmits to the companion device.

BACKGROUND

On the strength of the remarkable development of information communication technologies and semiconductor technologies, the supply and use of various portable terminals has rapidly increased. Particularly, recent portable terminals have come to the mobile convergence stage including areas of other terminals beyond typical inherent areas thereof. Representatively, mobile communication terminals have various functions such as a function for watching TV (for example, mobile broadcasting such as Digital Multimedia Broadcasting (DMB) or Digital Video Broadcasting (DVB)), a function for reproducing music (for example, Moving Picture Experts Group (MPEG) Audio Layer-3 (MP3)), a function for taking a picture, and a function for accessing the Internet as well as general communication functions such as voice calling or message transmission/reception.

By using a network, a host device (for example, a smart phone, a tablet Personal Computer (PC) or the like) may be connected to a companion device (for example, a watch, a headset, glasses or the like) working with the host device via a PICOnet (for example, Bluetooth (BT), Wireless Fidelity (WiFi) or the like). That is, the host device and the companion device may be connected to each other via the PICOnet, and thus provide various services (for example, a call, a message, streaming and the like) to users using the host device and the companion device.

SUMMARY

When a PICOnet connection with a host device is disconnected, a companion device switches the PICOnet connection to a Wide Area Network (WAN) connection to re-connect with the host device. In this case, the companion device may perform operations such as modem booting, a network search and the like. However, it takes a long time to make the re-connection between the companion device and the host device via a WAN communication scheme. Particularly, the companion device is highly likely to have network information related to the WAN communication stored in the companion device. Accordingly, the companion device may spend a significant amount of time searching for a network which can perform the WAN communication and also consume a significant amount of power while searching for the network which can perform the WAN communication.

The present invention has been made to address the above-mentioned problems and disadvantages, and to provide at least the advantages described below. Accordingly, an aspect of the present invention provides a method in which a host device transmits, to a companion device working with the host device, a Base Station (BS) list including lists of one or more BSs which can be connected to the host device and an electronic device which operates as the host device or the companion device.

In accordance with an aspect of the present invention, a method for managing a Base Station (BS) list by a first electronic device is provided. The method includes transmitting the BS list to a second electronic device connected to the first electronic device via short-range communication; determining whether a preset time lapses from the transmission of the BS list; updating the BS list when the preset timelapses; and transmitting the updated BS list to the second electronic device.

In accordance with another aspect of the present invention, a method for managing a BS list by a first electronic device is provided. The method includes transmitting the BS list to a second electronic device connected to the first electronic device via short-range communication; determining whether a BS connected via Wide Area Network (WAN) communication changes after the transmission of the BS list; updating the BS list when the BS connected via the WAN communication changes; and transmitting the updated BS list to the second electronic device.

In accordance with another aspect of the present invention, a method for managing a BS list by a first electronic device is provided. The method includes transmitting the BS list to a second electronic device connected to the first electronic device via short-range communication; determining whether a BS connected via Wide Area Network (WAN) communication changes after the transmission of the BS list; determining whether a Received Signal Strength Indicator (RSSI) of a signal transmitted from the second electronic device is less than a pre-stored reference value; updating the BS list when the RSSI is less than the pre-stored reference value; and transmitting the updated BS list to the second electronic device.

In accordance with another aspect of the present invention, a first electronic device for managing a BS list is provided. The first electronic device includes a communication module configured to transmit the BS list to a second electronic device connected to the first electronic device via short-range communication; and a list management module configured to determine whether a preset time lapses from the transmission of the BS list, update the BS list when the preset time lapses, and control the communication interface to transmit the updated BS list to the second electronic device.

In accordance with another aspect of the present invention, a method for managing a BS list by a first electronic device is provided. The method includes receiving a BS list from a second electronic device when a connection between the first electronic device and the second electronic device is configured via short-range communication; determining whether a preset time lapses from the reception of the BS list; making a request for the BS list to the second electronic device when the preset time lapses; and re-receiving the BS list from the second electronic device.

In accordance with another aspect of the present invention, a first electronic device is provided. The first electronic device includes a communication module configured to receive a BS list from a second electronic device when a connection between the first electronic device and the second electronic device is configured via short-range communication; and a connection management module configured to determine whether a preset time lapses from the reception of the BS list, control the communication interface to make a request for the BS list to the second electronic device when the preset time lapses, and control the communication interface to re-receive the BS list from the second electronic device.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

Figure 1:
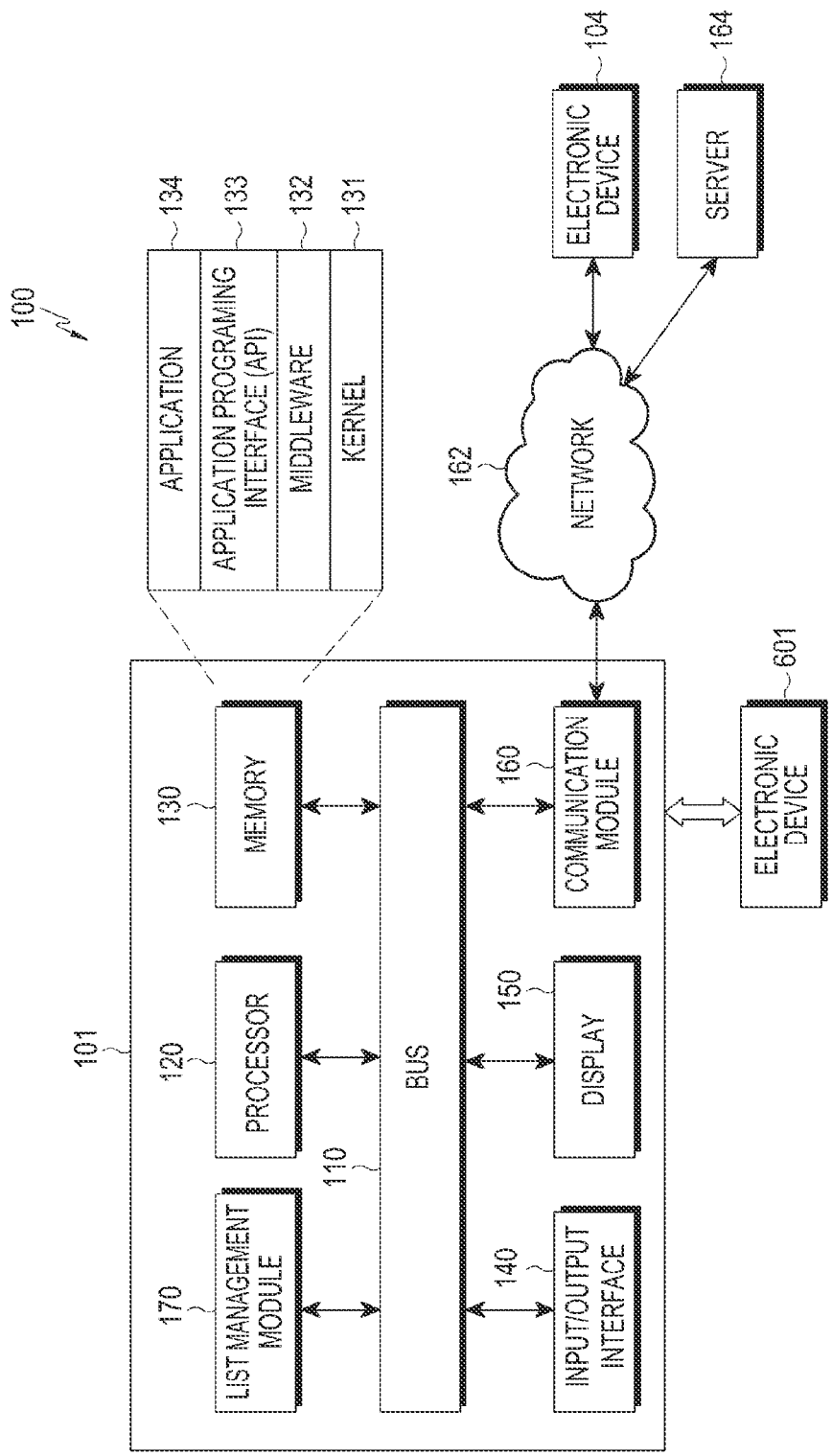
FIG. 1 illustrates a network environment including an electronic device according to an embodiment of the present invention.

Hereinafter, embodiments of the present invention are described with reference to the accompanying drawings. The present invention may be modified in various forms and includes various embodiments. Examples are illustrated in the drawings and described in the description. However, the description is not intended to limit the present invention to the embodiments, and it shall be appreciated that all the changes, equivalents and substitutions belonging to the idea and technical scope of the present invention are included in the present invention. In the description of the drawings, identical or similar reference numerals are used to designate identical or similar elements.

The term "include" or "may include" refers to the existence of a corresponding disclosed function, operation or component which can be used in an embodiment of the present invention and does not limit one or more additional functions, operations, or components. In the present disclosure, terms such as "include" or "have" may be construed to denote a characteristic, number, step, operation, constituent element, component or a combination thereof, but may not be construed to exclude the existence of or a possibility of addition one or more other characteristics, numbers, steps, operations, constituent elements, components or combinations thereof.

The term "or" used in an embodiment of the present invention includes any or all combinations of listed words. For example, the expression "A or B" may include A, may include B, or may include both A and B.

The expression "1", "2", "first", or "second" used in an embodiment of the present invention may modify various components of the embodiment but does not limit the corresponding components. For example, the above expressions do not limit the sequence and/or importance of the corresponding elements. The expressions may be used to distinguish a component element from another component element. For example, a first user device and a second user device indicate different user devices although both of them are user devices. For example, without departing from the scope of the present invention, a first component element may be named a second component element. Similarly, the second component element may also be named the first component element.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

In the present disclosure, the terms are used to describe an embodiment of the present invention, but are not intended to limit the present invention. As used herein, the singular forms are intended to include the plural forms as well, unless the context clearly indicates otherwise.

Unless defined differently, all terms used herein, which include technical terminologies or scientific terminologies, have the same meaning as understood by a person skilled in the art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

Electronic devices according to an embodiment of the present invention may be devices adopting a communication function. For example, the electronic devices may include at least one of smart phones, tablet Personal Computers (PCs), mobile phones, video phones, e-book readers, desktop PCs, laptop PCs, netbook computers, Personal Digital Assistants (PDAs), Portable Multimedia Players (PMPs), Moving Picture Experts Group Audio Layer 3 (MP3) players, mobile medical devices, cameras, wearable devices (e.g., Head-Mounted-Devices (HMDs) such as electronic glasses), electronic clothes, electronic bracelets, electronic necklaces, electronic appcessories, electronic tattoos, or smart watches.

According to an embodiment of the present invention, an electronic device may be a smart home appliance with a communication function. The smart home appliances may include at least one of, for example, televisions (TVs), Digital Video Disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to another embodiment of the present invention, the electronic devices may include at least one of various medical devices (e.g., a Magnetic Resonance Angiography (MRA), a Magnetic Resonance Imaging (MRI), a Computed Tomography (CT) machine, and an ultrasonic machine), navigation devices, Global Positioning System (GPS) receivers, Event Data Recorders (EDR), Flight Data Recorders (FDR), vehicle infotainment devices, electronic devices for ships (e.g., navigation devices for ships, and gyro-compasses), avionics, security devices, automotive head units, robots for home or industry, Automatic Teller Machines (ATMs) in banks, or Point Of Sale (POS) in shops.

According to another embodiment of the present invention, the electronic devices may include at least one of furniture or a part of a building/structure having a communication function, electronic boards, electronic signature receiving devices, projectors, or various measuring equipment (e.g., equipment for a water supply, an electricity, gases or radio waves). An electronic device according to an embodiment of the present invention may be a combination of one or more of the above described various devices. Also, an electronic device according to an embodiment of the present invention may be a flexible device. Also, an electronic device according to an embodiment of the present invention is not limited to the above described devices.

Hereinafter, an electronic device according to an embodiment of the present invention is described with reference to the accompanying drawings. In an embodiment of the present invention, the term "user" may indicate a person using an electronic device or a device (e.g. an artificial intelligence electronic device) using an electronic device.

Hereinafter, an electronic device may operate as a host device (for example, a smart phone, a tablet PC or the like) or a companion device (for example, a watch, a headset, glasses, an ankle band, a waist belt, a Head Mounted Display (HMD) or the like). When the electronic device operates as the host device, the electronic device transmits a BS list to the companion device working with the electronic device. In this case, the host device and the companion device may be connected to each other via a PICOnet. The host device provides services such as a call, a message, streaming and the like to the companion device via the PICOnet.

When the companion device goes beyond a range within which the host device and the companion device can be connected via the PICOnet, that is, a PICOnet coverage, the connection between the host device and the companion device via the PICOnet is disconnected. When the PICOnet connection is disconnected as described above, the companion device is connected to the host device via a Wide Area Network (WAN), not via the PICOnet. The companion device is connected to a BS via the WAN based on the BS list received from the host device. When the companion device is connected to the BS via the WAN, the companion device is re-connected to the host device via the WAN connection. When the host device and the companion device are connected to each other via the WAN connection, the companion device again receives the services such as the call, the message, the streaming and the like from the host device via the WAN connection.

When the electronic device operates as the companion device, the electronic device receives a BS list from the host device interworking with the electronic device. The BS list is a list including the BS currently connected to the host device or one or more BSs which can be connected to the host device. The BS list may be pre-stored in the host device or may be generated by the host device. Further, whenever the BS connected to the host device changes, the host device reflects the change of the BS in the BS list to update the BS list. Whenever the BS list is updated as described above, the host device transmits the updated BS list to the companion device.

Further, when the interworking between the electronic device and the host device is terminated, the electronic device operating as the companion device accesses the WAN by being connected to one BS included in the BS list based on the BS list most recently received from the host device. For example, the companion device sequentially accesses one or more BSs included in the BS list to determine a BS to connect to. Further, the companion device determines the BS to be connected with by attempting to access BSs sequentially from a BS closest to the host device to a BS farthest from the host device based on the BS list. By determining the BS to be connected to, based on the BS list most recently received from the host device as described above, the companion device reduces time spent searching for the BS and reduces power consumption.

The electronic device accessing the WAN is reconnected to the host device via the WAN connection and transmits/receives data to/from the host device via the WAN connection. Table 1 below is an example of a BS list.

TABLE 1

| Cell ID | Coverage | Existence or nonexistence of connection with host device | Distance from host device |
| --- | --- | --- | --- |
| BS #1 | 5 km | Connected | 0.8 km |
| BS #2 | 3 km | Not connected | 1.5 km |
| BS #3 | 5 km | Not connected | 2.5 km |
| ... | ... | ... | ... |

As shown in Table 1 above, the BS list includes one or more cell Identifier (ID) corresponding to each BS, the coverage of each BS, the existence or nonexistence of a connection with the host device, and the distance from the host device. Further, the BS list may be changed (e.g. updated) periodically, at every preset time by the host device (for example, every 5 minutes), whenever a BS connected to the host device is changed (e.g. whenever a cell including the host device is changed), or when a request for transmitting the BS list is received from the companion device.

FIG. 1 illustrates a network environment 100 including an electronic device 101 according to an embodiment of the present invention.

Referring to FIG. 1, the electronic device 101 includes a bus 110, a processor 120, a memory 130, an input/output interface 140, a display 150, a communication module 160, and a list management module 170.

The bus 110 is a circuit for connecting the above-described component elements with each other and to facilitate communication (for example, control messages) among the above-described component elements.

The processor 120 receives instructions from the above-described component elements (for example, the memory 130, the input/output interface 140, the display 150, the communication module 160, the list management module 170 and the like) via, for example, the bus 110, then decodes the received instructions and performs calculations or processes data according to the decoded instructions.

The memory 130 stores instructions or data received from the processor 120 or other component elements (for example, the input/output interface 140, the display 150, the communication module 160, the list management module 170 and the like) or generated by the processor 120 or other component elements. The memory 130 includes programming modules such as a kernel 131, a middleware 132, an Application Programming Interface (API) 133, applications 134 and the like. Each of the programming modules described above may be configured by software, firmware, hardware, or a combination of two or more thereof.

In an embodiment of the present invention, the memory 130 pre-stores the BS list. The memory 130 stores the BS list generated or updated by the list management module 170.

The kernel 131 controls or manages system resources (for example, the bus 110, the processor 120, the memory 130 or the like) which are used for performing operations or functions implemented by other programming modules, for example, the middleware 132, the API 133 or the applications 134. Further, the kernel 131 provides interfaces by which the middleware 132, the API 133 or the application 134 accesses each component of the electronic device 101 to control or manage them.

The middleware 132 plays an intermediate role between the API 133 or the application 134 and the kernel 131 to communicate with each other for transmission and reception of data. Further, in relation to requests for operation received from the applications 134, the middleware 132 controls (for example, scheduling or load-balancing) the requests for the operation by using, for example, a method of assigning a priority for use of the system resources (for example, the bus 110, the processor 120, the memory 130 or the like) of the electronic device 101 to at least one application among the applications 134.

The API 133 is an interface by which the applications 134 control functions provided from the kernel 131 or the middleware 132, and include, for example, at least one interface or function (for example, instructions) for file control, window control, image processing, text control, or the like.

According to an embodiment of the present invention, the applications 134 include a Short Message Service (SMS)/Multimedia Message Service (MMS) application, an e-mail application, a calendar application, an alarm application, a health care application (for example, an application for measuring a work rate or a blood sugar level), an environment information application (for example, an application for providing atmospheric pressure, humidity, or temperature information). Additionally or alternatively, the applications 134 may be applications related to the exchange of information between the electronic device 101 and an external electronic device (for example, an electronic device 104). The application related to the information exchange includes, for example, a notification relay application for transmitting information to the external electronic device, or a device management application for managing the external electronic device.

For example, the notification relay application includes a function of transferring notification information generated in other applications (for example, the SMS/MMS application, the e-mail application, the health care application, or the environmental information application) of the electronic device 101 to an external electronic device 104. Additionally or alternatively, the notification relay application receives notification information from, for example, an external electronic device 104 and provides the same to a user. The device management application, for example, manages (for example, install, delete, or update) at least some functions (for example, turning an external electronic device (or some elements) on or off or adjusting the brightness (or resolution) of a display) of an external electronic device 104 that communicates with the electronic device 101, applications performed in the external electronic device, or services (for example, a phone call service, or a messaging service) provided in the external electronic device.

According to various embodiments of the present invention, the applications 134 include applications, which are designated according to the property (for example, the type of electronic device) of the external electronic device 104. For example, in a case where the external electronic device is an MP3 player, the applications 134 include an application related to the reproduction of music. Similarly, when the external electronic device is a mobile medical device, the application 134 includes an application related to health care. According to an embodiment of the present invention, the application 134 includes at least one application designated in the electronic device 101 or received from an external electronic device (for example, a server 106 or the electronic device 104).

The input/output interface 140 transfers instructions or data input by a user via an input/output device (for example, a sensor, a keyboard, or a touch screen) to the processor 120, the memory 130, the communication module 160, or the list management module 170 via, for example, the bus 110. For example, the input/output interface 140 provides the processor 120 with data for a user's touch which is input via the touch screen. The input/output interface 140 outputs the instructions or data received, via, for example, the bus 110, the processor 120, the memory 130, the communication module 160, or the list management module 170 via the input/output device (for example, a speaker or a display). For example, the input/output interface 140 outputs voice data processed by the processor 120 to the user via a speaker.

The display 150 displays various pieces of information (for example, multimedia data or text data) for the user. The display 150 informs the user of a PICOnet disconnection with the electronic device 104 or a WAN connection with the electronic device 104 under control of the list management module 170.

The communication module 160 facilitates communication between the electronic device 101 and the external device (for example, the electronic device 104 or the server 164). For example, the communication module 160 accesses a network 162 via a wireless or wired communication to communicate with the external device. The wireless communication include at least one of, for example, Wi-Fi, Bluetooth (BT), Near Field Communication (NFC), Global Positioning System (GPS) and cellular communication (for example, Long Term Evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM) or the like). The wired communication includes at least one of, for example, a Universal Serial Bus (USB), a High Definition Multimedia Interface (HDMI), a Recommended Standard 232 (RS-232), and a Plain Old Telephone Service (POTS).

According to an embodiment of the present invention, the network 162 is a telecommunication network. The telecommunication network includes at least one of a computer network, the Internet, the Internet of Things, and a telephone network. According to an embodiment of the present invention, a protocol (for example, a transport layer protocol, data link layer protocol, or a physical layer protocol) for communication between the electronic device 101 and an external device is supported in at least one of the applications 134, the application programming interface 133, the middleware 132, the kernel 131, and the communication module 160.

The list management module 170 processes at least a part of information acquired from other component elements (for example, the processor 120, the memory 130, the touch sensor 140, and the communication module 160), and provides the processed information to the user via various methods. For example, the list management module 170 controls at least some functions of the electronic device 101 such that the electronic device 101 may work with other electronic devices (for example, the electronic device 104 or the server 164) by using the processor 120 or independently therefrom.

The list management module 170 determines a BS currently connected to the electronic device 101 and one or more BSs which can be connected to the electronic device 101 based on Global Positioning System (GPS) information. Further, the list management module 170 acquires current GPS information of the electronic device 101 and determines the BS which can be connected to the electronic device 101 based on the GPS information. The list management module 170 determines BSs located closest to the electronic device 101 as the BSs which can be connected to the electronic device 101 based on the GPS information.

The list management module 170 generates a BS list including the BS currently connected to the electronic device 101 and one or more BSs which can be connected to the electronic device 101. For example, the list management module 170 generates a BS list including a first BS, a second BS, and a third BS. In an embodiment of the present invention, when the BS connected to the electronic device 101 is changed, the list management module 170 reflects the change of the BS in the BS list to change (e.g. update) the BS list.

The list management module 170 acquires BS information of the BS currently connected to the electronic device 101 and determines one or more BSs which can be connected to the electronic device 101 based on the BS information. The list management module 170 generates a BS list including one or more BSs which can be connected to the electronic device 101. For example, the list management module 170 generates a BS list including the first BS currently connected to the electronic device 101 and the second and third BSs which can be connected to the electronic device 101. In an embodiment of the present invention, when the BS connected to the electronic device 101 is changed, the list management module 170 reflects the change of the BS in the BS list to update the BS list.

The list management module 170 transmits the generated or updated BS list to the companion device (for example, the electronic device 104). The list management module 170 transmits the BS list to the communication module 160 via the bus 110. In this case, the communication module 160 transmits the BS list to the companion device 104 under control of the list management module 170.

According to an embodiment of the present invention, the list management module 170 receive GPS information (for example, GPS coordinates) showing a position of the electronic device 101 periodically every preset reference time (for example, every 5 minutes) from a GPS module included in the electronic device 101. The list management module 170 identifies whether the electronic device 101 is moving, based on the GPS information of the electronic device 101. For example, the list management module 170 may determine that the electronic device 101 has moved 1 km in 10 minutes based on the GPS information continuously transmitted to the list management module 170.

According to an embodiment of the present invention, the electronic device 104 corresponding to the companion device includes a GPS module which is separate from the electronic device 101 corresponding to the host device for acquiring GPS information (for example, the GPS coordinates) of the electronic device 104. Further, the electronic device 104 determines a position of the electronic device 104 based on the GPS information and searches for one or more BSs according to the determined position. For example, the electronic device 104 searches for BSs located within a preset range (for example, within a radius of 3 km) from the position of the electronic device 104. The electronic device 104 determines a BS which is closest to the electronic device 104 among the found BSs and accesses the closest BS to connect to the closest BS. In this case, the electronic device 104 searches for one or more BSs in the same manner as the electronic device 101 corresponding to the host device. According to an embodiment of the present invention, the electronic device 104 corresponding to the companion device determines a BS which the electronic device 104 newly accessed using GPS information and a BS list received from the electronic device 101 corresponding to the host device. The electronic device 104 includes a GPS module that is separate from the electronic device 101 corresponding to the host device for acquiring GPS information (for example, GPS coordinates) of the electronic device 104. The electronic device 104 determines a BS which is closest to the electronic device 104 among the BSs included in the BS list based on the GPS information.

Additional information on the list management module 170 is provided below via FIGS. 2 to 5 described below.

Figure 2:
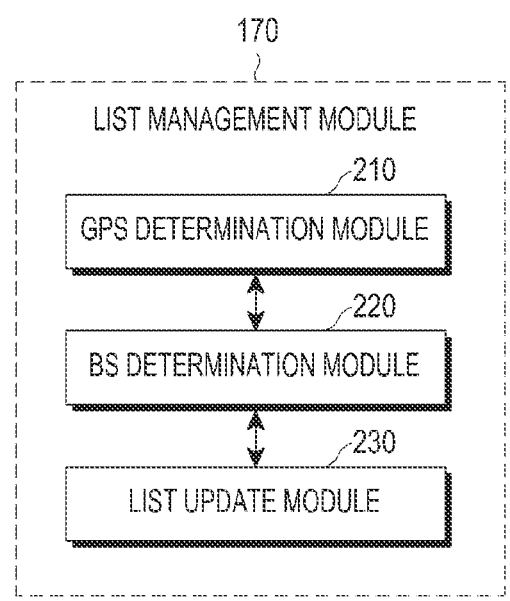
FIG. 2 is a block diagram of a list management module included in an electronic device according to an embodiment of the present invention.

FIG. 2 is a block diagram of the list management module 170 included in the electronic device (for example, the electronic device 101) according to various embodiments.

Referring to FIG. 2, the list management module 170 includes a BS determination module 220 and a list update module 230, and further includes a GPS determination module 210.

The GPS determination module 210 acquires GPS information of the electronic device 101. The GPS determination module 210 receives radio waves from a plurality of GPS satellites in Earth's orbit and calculates a location of the electronic device 101 using Time of Arrival of the radio waves from the plurality of GPS satellites to the electronic device 101.

The BS determination module 220 determines one or more BSs which are currently connected to the electronic device 101 or which can be connected to the electronic device 101. For example, the BS determination module 220 may determine a first BS which is currently connected to the electronic device 101, a second BS, a third BS, and a fourth BS which are not currently connected to the electronic device 101 but can be connected to the electronic device 101. The BS determination module 220 determines a BS which is closest to the electronic device 101 based on GPS information of the electronic device 101 determined by the GPS determination module 210 and controls the electronic device 101 to connect to the BS which is closest to the electronic device 101.

The list update module 230 generates a BS list based on BS information or updates the BS list. In this case, the BS information indicates information (for example, a cell ID, a distance from the electronic device 101, a signal strength and the like) on a BS which can be connected to the electronic device 101 as determined by the BS determination module 220. The BS list is a list including BSs which are connected to the electronic device 101 or can be connected to the electronic device 101 or a list including BS information on each BS.

For example, when the BSs which can be connected to the electronic device 101 are changed according to movement of the electronic device 101, the list update module 230 updates the BS list. In this case, the list update module 230 changes or edits the BS list such that only the BSs which can be currently connected to the electronic device 101 are included in the BS list. For example, it is assumed that BSs which can be connected to the electronic device 101 at a first time point are the first BS, the second BS, the third BS, and the fourth BS. The BS determination module 220 generates a BS list including the first BS, the second BS, the third BS, and the fourth BS. When it is assumed that the BSs which can be connected to the electronic device at a second time point are the second BS, the third BS, the fourth BS, and a fifth BS, the BS determination module 220 deletes the first BS from the BS list and adds the fifth BS to the BS list, so as to generate a new BS list.

Figure 3:
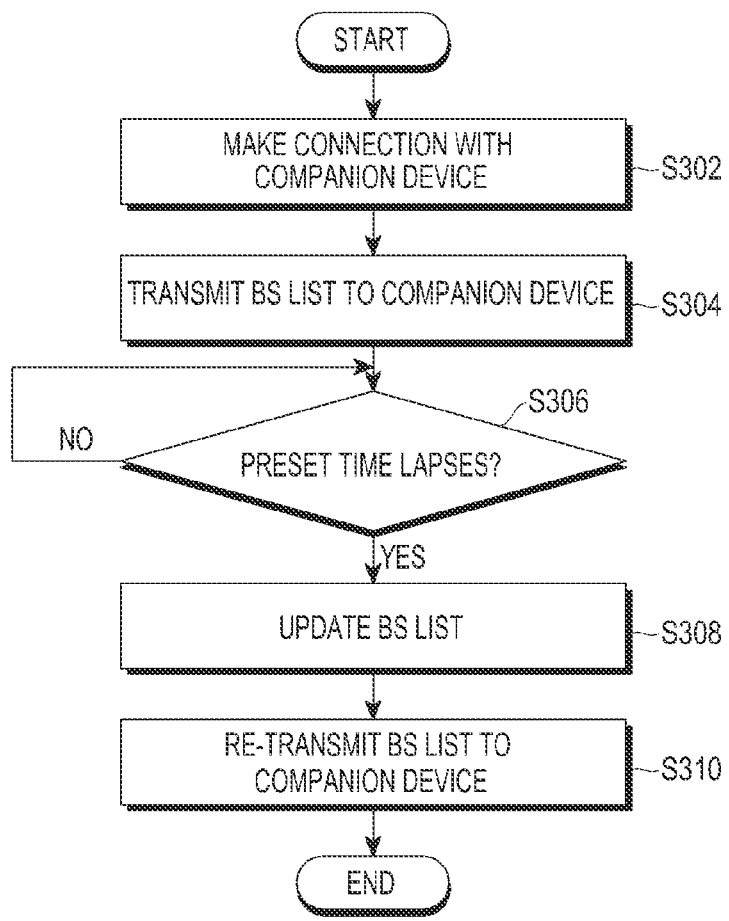
FIG. 3 is a flowchart of a method of managing a BS list by an electronic device according to an embodiment of the present invention.

FIG. 3 is a flowchart of a method in which the electronic device 101 manages the BS list according to an embodiment of the present invention.

Referring to FIG. 3, the electronic device 101 is connected to a companion device (for example, the electronic device 104) via a PICOnet connection in step S302. When the electronic device 101 is connected to the companion device, the electronic device 101 transmits a BS list, which is pre-stored in the memory 130, to the companion device via the communication module 160 in step S304. The electronic device 101 is connected to one BS and then the BS list including BS information on the BS is pre-generated and stored in step S304.

As described above, after the BS list is transmitted to the companion device, the list management module 170 of the electronic device 101 determines whether a preset time lapses (for example, five minutes) after the transmission of the BS list in step S306. When the preset time lapses (e.g. "Yes" in step S306) is the result of the determination of step S306, the list management module 170 updates the BS list stored in the memory 130 in step S308.

The list management module 170 transmits the updated BS list to the companion device (for example, the electronic device 104) via the communication module 160 in step S310.

When the preset time does not lapse (e.g. "No" in step S306) as a result of the determination in step S306, the list management module 170 controls the electronic device to wait until the preset time lapses.

As described above, the list management module 170 updates the BS list periodically, every time the preset time lapses. To this end, the BS determination module 220 of the list management module 170 determines the BS which is connected to the electronic device 101 periodically, every time the preset time lapses. When the BS connected to the electronic device 101 is determined, the list update module 230 of the list management module 170 updates the BS list. Further, the list management module 170 controls the communication module 160 to transmit the updated BS list to the companion device periodically, every time the preset time lapses. Further, the list management module 170 controls the communication module 160 to transmit the updated BS list to the companion device whenever the BS list is updated.

In an embodiment of the present invention, even though the preset time lapses, the BS list may be maintained (i.e., not updated). For example, the electronic device 101 connected to the first BS may be still connected to the first BS even though the preset time (for example, five minutes) lapses. Further, one or more BSs which can be connected to the electronic device 101 may be the same as those before the preset time lapses. The list management module 170 controls the communication module 160 to re-transmit the BS list to the companion device if the BS which is connected to the electronic device 101 or the BSs which can be connected to the electronic device 101 are not changed.

Figure 4:
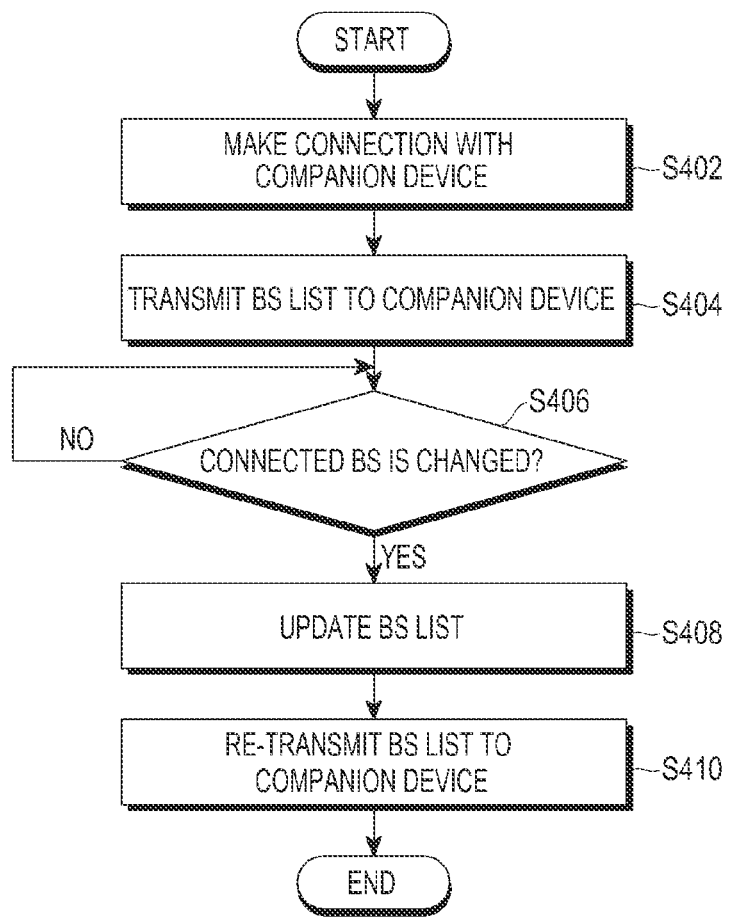
FIG. 4 is a flowchart of a method of managing a BS list by an electronic device according to an embodiment of the present invention.

FIG. 4 is a flowchart of a method in which the electronic device 101 manages the BS list according to an embodiment of the present invention.

Referring to FIG. 4, the electronic device 101 is connected to the companion device (for example, the electronic device 104) in step S402. When the electronic device 101 is connected to the companion device, the electronic device 101 transmits a BS list, which is pre-stored in the memory 130, to the companion device via the communication module 160 in step S404.

As described above, after the BS list is transmitted to the companion device, the list management module 170 of the electronic device 101 determines whether the BS connected to the electronic device 101 has changed in step S406.

When the BS connected to the electronic device 101 is determined to have changed in S406 (e.g. "Yes" in step S406), the list management module 170 updates the BS list stored in the memory 130 in step S408. In an embodiment of the present invention, the list management module 170 checks the BS connected to the electronic device 101, and updates the BS list when the BS connected to the electronic device 101 has changed. Then, the list management module 170 transmits the updated BS list to the companion device 104 via the communication module 160 in step S410.

When the BS is determined not to have changed in step S406 (e.g. "No" in step S406), the list management module 170 controls the electronic device 101 to wait until the BS connected to the electronic device 101 changes.

In an embodiment of the present invention, the list management module 170 checks the BS connected to the electronic device 101 periodically, at every preset time (for example, every five minutes). Accordingly, the BS determination module 220 of the list management module 170 determines the BS connected to the electronic device 101 periodically, at every preset time (for example, every five minutes). As a result of checking the BS connected to the electronic device 101, when the BS connected to the electronic device 101 changes (for example, the BS connected to the electronic device 101 changes to the second BS from the first BS), the list update module 230 of the list management module 170 updates the BS list. Further, the list management module 170 controls the communication module 160 to transmit the updated BS list to the companion device whenever the BS list is updated.

As a result of the determination in step S406, when the BS does not change (e.g. "No" in step S406), the list management module 170 maintain the BS list. As described above, when the BS list is maintained, the list management module 170 controls the communication module 160 to re-transmit the maintained BS list to the companion device. In an embodiment of the present invention, the list management module 170 controls the electronic device 101 to not transmit the maintained BS list to the companion device and to stand by.

Figure 5:
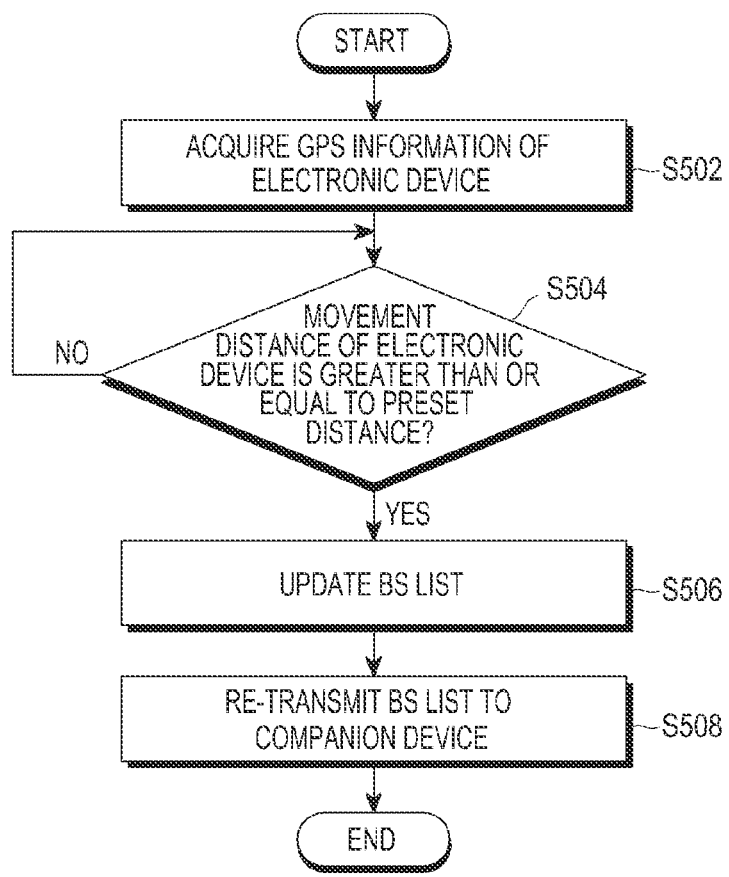
FIG. 5 is a flowchart of a method of managing a BS list by an electronic device according to an embodiment of the present invention.

FIG. 5 is a flowchart illustrating a method in which the electronic device 101 manages the BS list according to an embodiment of the present invention.

Referring to FIG. 5, the GPS information module 210 of the list management module 170 acquires GPS information (for example, GPS coordinates) of the electronic device 101 in step S502. In some embodiments, the GPS information module 210 may acquire the GPS information of the electronic device 101 at every preset time (for example, ten minutes).

The list management module 170 determines whether a movement distance of the electronic device 101 is greater than or equal to a preset distance (for example, 1 km) based on the GPS information in step S504. When the movement distance of the electronic device 101 is determined to be greater than or equal to the preset distance in step S504 (e.g. "Yes" in step S504), the list update module 230 updates the BS list in step S506. In this case, the BS determination module 220 checks the BS connected to the electronic device 101, and the list update module 230 updates the BS list based on a result of the check.

Then, the list management module 170 transmits the updated BS list to the companion device 104 via the communication module 160 in step S508.

When the movement distance of the electronic device 101 is determined to be less than the preset distance (for example, 1 km) in step S504 (e.g. "No" in step S504), the list management module 170 controls the electronic device 101 to wait until the movement distance of the electronic device 101 reaches the preset distance.

In steps S504 to S506, even though the movement distance of the electronic device 101 becomes greater than or equal to the preset distance, the BS connected to the electronic device 101 may not change. When the movement distance becomes greater than or equal to the preset distance, the BS determination module 220 checks the BS connected to the electronic device 101. When the result of the check is that the BS does not change, the list management module 170 maintains the BS list. As described above, when the BS list is maintained, the list management module 170 controls the communication module 160 to re-transmit the maintained BS list to the companion device. In an embodiment of the present invention, the list management module 170 controls the electronic device 101 to not transmit the maintained BS list to the companion device and to stand by. That is, when the BS does not change even though the movement distance of the electronic device 101 reaches the preset distance (for example, 1 km), the current BS list may be maintained.

According to an embodiment of the present invention, the BS determination module 220 simultaneously determines the BS currently connected to the electronic device 101 and checks one or more BSs which can be connected to the electronic device 101. Further, the list management module 170 determines a BS to be connected to the electronic device 101 based on the BS which is currently connected to the electronic device 101 and the one or more BSs which can be connected to the electronic device. For example, it is assumed that the BS connected to the electronic device 101 is the first BS and the BSs which can be connected to the electronic device 101 are the second BS and the third BS. For example, when it is assumed that an interval between the electronic device 101 and the first BS is 2 km, an interval between the electronic device 101 and the second BS is 1 km, and an interval between the electronic device 101 and the third BS is 5 km, the list management module 170 controls the electronic device 101 to connect to the BS which is closest to the electronic device 101 among the first to third BSs. Accordingly, the list management module 170 controls the electronic device 101 to disconnect from the first BS and connect to the second BS. As described above, when the electronic device 101 which has been connected to the first BS terminates the connection with the first BS and is newly connected to the second BS, the list update module 230 updates the BS list. Further, the list management module 170 controls the communication module 160 to transmit the updated BS list to the companion device.

Figure 6:
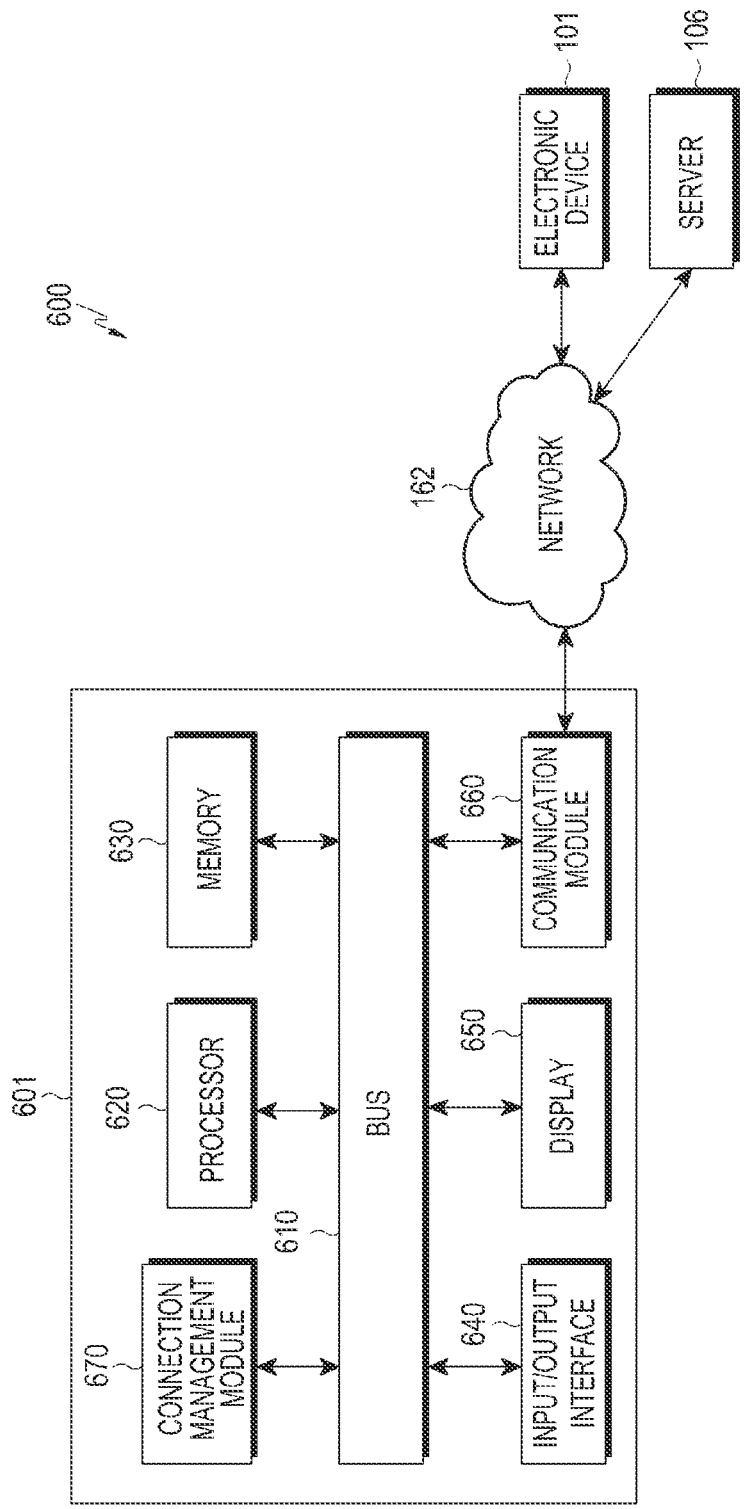
FIG. 6 illustrates a network environment including an electronic device according to an embodiment of the present invention.

FIG. 6 illustrates a network environment 600 including an electronic device 601 according to an embodiment of the present invention.

Referring to FIG. 6, the electronic device 601 includes a bus 610, a processor 620, a memory 630, an input/output interface 640, a display 650, a communication module 660, and a connection management module 670.

The bus 610 is a circuit to connect the above-described component elements with each other and to transfer communication (for example, control messages) among the above-described component elements.

The processor 620 receives instructions from the above-described component elements (for example, the memory 630, the input/output interface 640, the display 650, the communication module 660, the connection management module 670 and the like) via, for example, the bus 610, then decodes the received instructions and performs calculations or data processing according to the decoded instructions.

The memory 630 stores instructions or data received from the processor 620 or other component elements (for example, the input/output interface 640, the display 650, the communication module 660, the connection management module 670 and the like) or generated by the processor 620 or other component elements. Similar to the memory 130 illustrated in FIG. 1, the memory 630 includes, for example, a kernel, middleware, an Application Programming Interface (API) or programming modules such as an application and the like. Each of the programming modules described above may be configured by software, firmware, hardware, or a combination of two or more thereof.

The memory 630 stores the BS list received from the host device (for example, the electronic device 101).

The input/output interface 640 transfers instructions or data input by a user via an input/output device (for example, a sensor, a keyboard, or a touch screen) to the processor 620, the memory 630, the communication module 660, or the connection management module 670 via, for example, the bus 610. For example, the input/output interface 640 provides the processor 620 with data for a user's touch which is input via the touch screen. Further, the input/output interface 1140 outputs the instructions or data received, via, for example, the bus 610, from the processor 620, the memory 630, the communication module 660, or the connection management module 670 via the input/output device (for example, speaker or display). For example, the input/output interface 640 outputs voice data processed by the processor 620 to the user via the speaker.

The display 650 displays various pieces of information (for example, multimedia data or text data) for the user.

The communication module 660 facilitates communication between the electronic device 601 and the host device (for example, the electronic device 101). The wireless communication may be short-range communication such as WiFi, BlueTooth (BT), Near Field Communication (NFC) or the like. The communication module 660 transmits/receives various types of data to/from the host device via the short-range communication. Further, the communication module 660 receives the BS list from the host device 101. In this case, the communication module 660 receives the BS list from the host device periodically, every preset time (for example, every minute) by the host device or the electronic device 601 or whenever the BS list is updated. Further, the communication module 660 makes a request for transmitting the BS list to the host device under control of the connection management module 670. In this case, the communication module 660 transmits a list request message generated by the connection management module 670 to the host device.

The communication module 660 accesses the network 162 via wireless or wired communication to communicate with the server 106. The wireless communication includes at least one of GPS or cellular communication (for example, LTE, LTE-A, CDMA, WCDMA, UMTS, WiBro, GSM or the like). The network 162 is a communication network. The communication network includes at least one of a computer network, the Internet, the Internet of Things, or a telephone network. According to an embodiment of the present invention, a protocol (for example, a transport layer protocol, a data link layer protocol, or a physical layer protocol) for communication between the electronic device 104 and the host device 101 is supported by at least one of the application, the API, the middleware, the kernel, and the communication module 660.

When the connection with the host device via the short-range communication is disconnected, the communication module 660 accesses the BS (for example, the server 106) to configure a connection between the electronic device 601 and the BS under control of the connection management module 670. Further, the communication module 660 is re-connected to the host device 101 via the server 106. The connection with the host device 101 may be disconnected when the electronic device 601 exits the PICOnet coverage area of the host device which formed the PICOnet. When the connection with the host device is disconnected, the connection management module 670 controls the communication module 660 such that the electronic device 104 connects with the BS by executing a standalone mode.

The connection management module 670 processes at least a part of information acquired from other component elements (for example, the processor 620, the memory 630, the input/output interface 640, and the communication module 660), and provides the processed information to the user via various methods. For example, the connection management module 670 may control at least some functions of the electronic device 601 such that the electronic device 601 works with the host device 101 by using the processor 620 or independently therefrom.

When the connection between the electronic device 601 and the host device 101 is disconnected, the connection management module 670 determines a BS to be connected with the electronic device 601 based on the BS list stored in the memory 630.

The connection management module 670 controls the communication module 660 to make a request for transmitting the BS list to the host device 101. In this case, the connection management module 670 generates a list request message for making a request for the BS list. The communication module 660 makes a request for the BS list to the host device by transmitting a list request message to the host device.

When the communication module 660 receives the BS list from the host device in response to the list request message, the connection management module 670 stores the BS list in the memory 630. Further, the connection management module 670 controls the communication module 660 to connect the electronic device 601 with one of the one or more BSs included in the BS list. The connection management module 670 controls the communication module 660 to connect the electronic device 601 with the BS connected to the host device 101 or the BS which is closest to the electronic device 601 among the BSs included in the BS list.

When the electronic device 601 is re-connected to the host device via the BS, the connection management module 670 controls the communication module 660 to transmit/receive data to/from the host device via the BS.

The connection management module 670 determines whether to make a request for the BS list to the host device based on the strength of a signal transmitted from the host device 101, that is, a Received Signal Strength Indicator (RSSI). In a state where the electronic device 601 works with the host device via a short-range wireless communication, the connection management module 670 determines whether the strength of the signal (e.g. signal strength) transmitted to the electronic device 601 from the host device is less than a reference value pre-stored in the memory 630. When the signal strength is greater than or equal to the reference value, the connection management module 670 does not make a request for the BS list to the host device. When the signal strength is less than the reference value, the connection management module 670 makes a request for the BS list to the host device by controlling the communication module 660.

Figure 7:
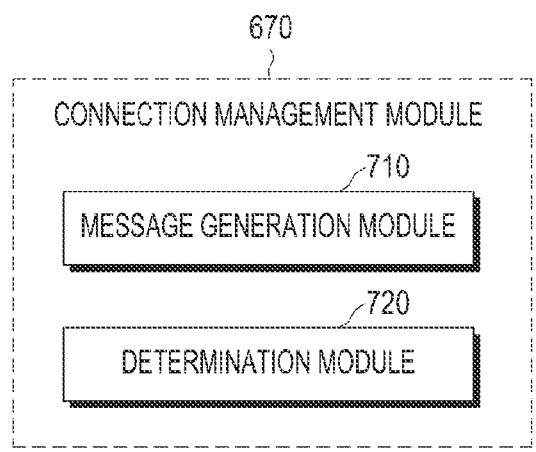
FIG. 7 is a block diagram of a connection management module included in an electronic device according to an embodiment of the present invention.

FIG. 7 is a block diagram 700 of the connection management module 670 included in the electronic device 601 according to various embodiments of the present invention.

Referring to FIG. 7, the connection management module 670 includes a message generation module 710 and a determination module 720.

The message generation module 710 generates a list request message for making a request for the BS list to the host device.

When the connection between the electronic device 601 and the host device 101 is disconnected, the determination module 720 determines a BS to connect to, based on the BS list stored in the memory 630. The determination module 720 determines a BS which was most recently connected to the electronic device 601 or a BS which is closest to the electronic device 601 as the BS to connect to.

When the connection between the electronic device 601 and the host device (for example, the electronic device 101) is disconnected, the determination module 720 determines the latest list among the BS lists stored in the memory 630. For example, it is assumed that a first list, a second list, and a third list are stored in the memory 630 as the BS lists. The determination module 670 determines the BS to be connected to the electronic device 601 based on a BS list which was most recently received among the first to third lists. The determination module 720 determines the BS to be connected to the electronic device 601 based on the BS list which was most recently received among the BS lists which are stored last in the memory 630 or the BS lists received from the host device. That is, the determination module 720 determines the latest BS list from among the BS lists stored in the memory 630.

Figure 8:
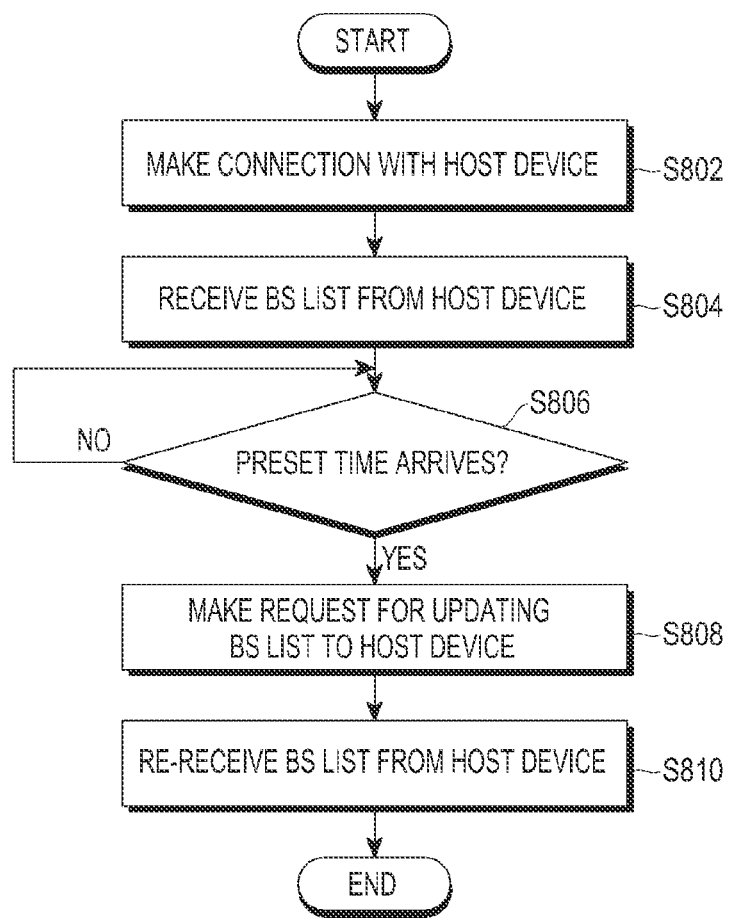
FIG. 8 is a flowchart of a method of managing a BS list by an electronic device according to an embodiment of the present invention.

FIG. 8 is a flowchart of a method in which the electronic device 601 manages the BS list according to an embodiment of the present invention.

Referring to FIG. 8, the electronic device 601 is connected to the host device in step S802. When the electronic device 601 is connected to the host device, the communication module 660 of the electronic device 601 receives the BS list from the host device in step S804.

The connection management module 670 of the electronic device 601 determines whether a preset time (for example, five minutes) lapses from the reception of the BS list in step S806.

When the preset time lapses (e.g. "Yes" in step S806) is the result of the determination in step S806, the connection management module 670 controls the communication module 660 of the electronic device 601 to make a request for updating the BS list to the host device in step S808. In this case, the message generation module 710 of the connection management module 670 generates a list request message for making the request for updating the BS list. Further, the communication module 660 of the electronic device 601 receives the updated BS list from the host device as a response to the list request message in step S810. When the communication module 660 receives the updated BS list, the connection management module 670 stores the updated BS list in the memory 630.

In an embodiment of the present invention, the host device (for example, the electronic device 101) re-transmits to the electronic device 601 in step S810 the same BS list as that transmitted to the electronic device 601 in step S802. That is, the electronic device 601 receives the BS list which has not been updated from the host device. Even though the electronic device 601 receives the non-updated BS list, the connection management module 670 re-stores the received BS list in the memory 630.

In an embodiment of the present invention, the connection management module 670 records a time when the BS list is received or a version of the BS list in the memory 670 to correspond to the BS list whenever the BS list is received from the host device. As described above, by recording the time when the BS list is received or the version of the BS list, the connection management module 670 enables the electronic device 601 to have the latest BS list. For example, it is assumed that a first list is received at a time 14:01:30 in hours, minutes, and seconds and received again at 14:15:30. Further, the connection management module 670 identifies that the first list is the latest BS list by identifying the time when the BS list is received. Thereafter, if the connection between the electronic device 601 and the host device is disconnected at 14:20:00, the connection management module 670 determines the BS to be connected to the electronic device 601 based on the latest BS list, that is, the first BS list received at 14:15:30.

Figure 9:
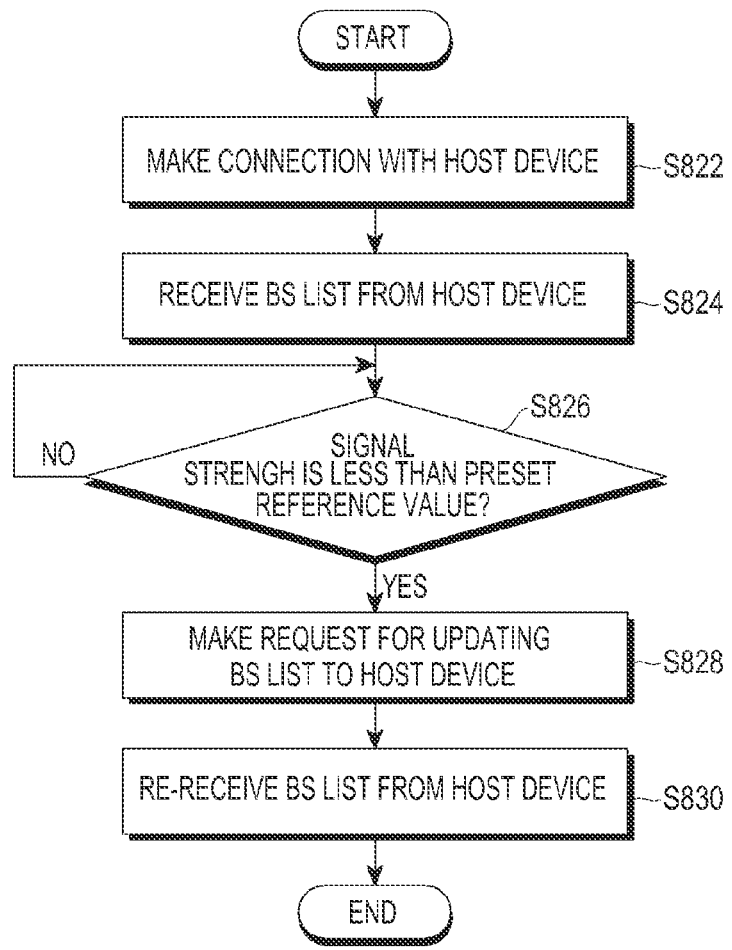
FIG. 9 is a flowchart of a method of managing a BS list by an electronic device according to an embodiment of the present invention.

FIG. 9 is a flowchart of a method in which the electronic device 601 manages a BS list according to an embodiment of the present invention.

Referring to FIG. 9, the electronic device 101 is connected to a host device (for example, the electronic device 101) in step S822. In an embodiment of the present invention, the electronic device 601 receives the BS list from the host device just after the connection with the host device in step S824.

Thereafter, the connection management module 670 of the electronic device 601 controls the electronic device 601 to measure the signal strength of a signal transmitted from the host device in step S826. The connection management module 670 determines whether the signal strength is less than a preset reference value in step S826. The strength of the signal transmitted from the host device may increase as an interval between the host device and the electronic device 601 decreases and may decrease as the interval increases. Further, as the signal strength increases, communication between the electronic device 601 and the host device improves. Further, as the signal strength decreases, the data communication between the electronic device 601 and the host device deteriorates. A decrease in signal strength may relate to difficulty in receiving data from the host device 101 by the electronic device 601 corresponding to the companion device. When the signal strength falls below a value (for example, a threshold), data transmission/reception between the host device and the electronic device 601 may not be possible. The connection management module 670 controls the electronic device 601 to make a request for the BS list to the host device before the data communication between the host device and the electronic device 601 is performed based on the signal strength.

When it is determined in step S826 that the signal strength is less than a preset reference value (e.g. "Yes" in step S826), the connection management module 670 may control the communication module 660 to make the request for the BS list to the host device in step S828. For example, when it is assumed that the signal strength is divided into ten levels (e.g. LV.1 to LV.10), the connection management module 670 controls the electronic device 601 to make the request for the BS list to the host device if the signal strength is less than LV.3. Further, in an embodiment of the present invention, when BSs are already stored in the memory 630, the connection management module 670 makes a request to the host device for updating the BS list in step S828. The message generation module 710 of the connection management module 670 generates a list request message for making the request for the update of the BS list.

The communication module 660 of the electronic device 601 re-receives the BS list from the host device in response to the request of step S828 in step S830. In an embodiment of the present invention, in response to the list request message, the updated BS list is received via the communication module 660. When the updated BS list is received, the connection management module 670 stores the updated BS list in the memory 630.

When it is determined in step S826 that the signal strength is greater than or equal to the preset reference value (e.g. "No" in step S826), the connection management module 670 controls the electronic device 601 to stand by without making a request for the BS list to the host device.

Figure 10:
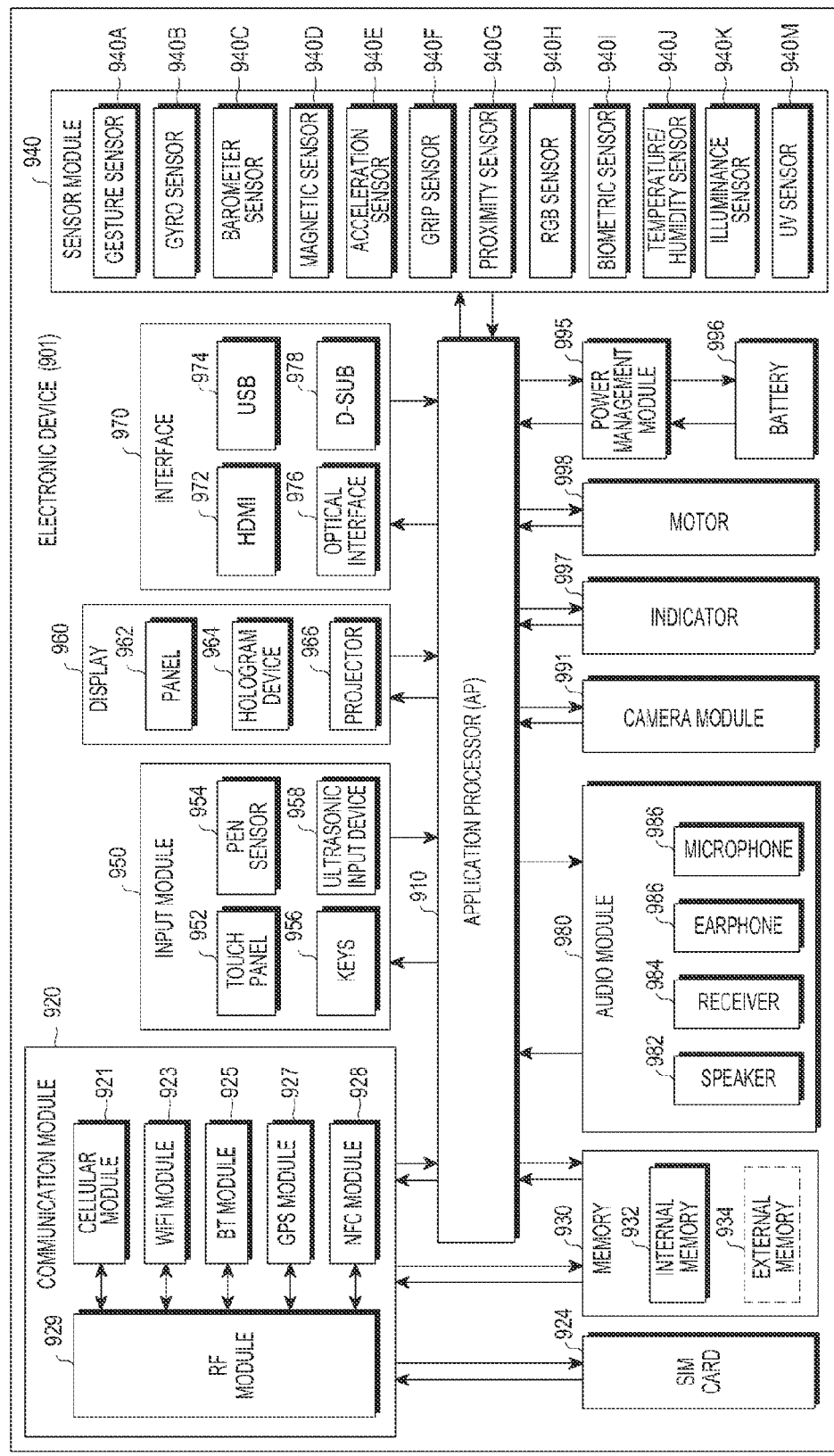
FIG. 10 is a block diagram of an electronic device according to an embodiment of the present invention.

FIG. 10 is a block diagram of an electronic device 901 according to an embodiment of the present invention. The electronic device 901 may constitute, for example, all or a part of the electronic device 101 illustrated in FIG. 1 or the electronic device 601 illustrated in FIG. 6. Referring to FIG. 10, the electronic device 901 includes at least one Application Processor (AP) 910, a communication module 920, a Subscriber Identifier Module (SIM) card 924, a memory 930, a sensor module 940, an input module 950, a display 960, an interface 970, an audio module 980, a camera module 991, a power management module 995, a battery 996, an indicator 997, and a motor 998.

The AP 910 controls a plurality of hardware or software components connected to the AP 910 by driving an operating system or an application program, processes various data including multimedia data, and performs calculations. The AP 910 may be implemented by, for example, a System on Chip (SoC). According to an embodiment of the present invention, the AP 910 may further include a Graphics Processing Unit (GPU).

The communication module 920 (for example, the communication module 160) performs data transmission/reception in communication between the electronic device 901 (for example, the electronic device 101) and other electronic devices (for example, the electronic device 104 or the server 106) connected to the electronic device 901 via a network. According to an embodiment of the present invention, the communication module 920 includes a cellular module 921, a Wi-Fi module 923, a BT module 925, a GPS module 927, an NFC module 928, and a Radio Frequency (RF) module 929.

The cellular module 921 provides a voice call, a video call, a message service, or an Internet service via a communication network (for example, LTE, LTE-A, CDMA, WCDMA, UMTS, WiBro, GSM, or the like). Also, the cellular module 921 identifies and authenticates an electronic device in a communication network using, for example, a Subscriber Identification Module (for example, the SIM card 924). According to an embodiment of the present invention, the cellular module 921 performs at least some of the functions which can be provided by the AP 910. For example, the cellular module 921 performs at least a part of a multimedia control function.

According to an embodiment of the present invention, the cellular module 921 includes a Communication Processor (CP). Further, the cellular module 921 may be implemented by, for example, in an SoC. Although FIG. 9 illustrates that the components such as the cellular module 921 (for example, the CP), the memory 930, and the power management module 995 are separate from the AP 910, the AP 910 may include at least some of the above described components (for example, the cellular module 921) according to an embodiment of the present invention.

According to an embodiment of the present invention, the AP 910 or the cellular module 921 (for example, the CP) loads a command or data received from at least one of a non-volatile memory and other components connected to each of the AP 910 and the cellular module 921 to a volatile memory and processes the loaded command or data. Further, the AP 910 or the cellular module 921 stores data received from at least one of the other elements or created by at least one of the other elements in a non-volatile memory.

Each of the Wi-Fi module 923, the BT module 925, the GPS module 927, and the NFC module 928 includes, for example, a processor for processing data transmitted/received via the corresponding module. In FIG. 10, the cellular module 921, the WiFi module 923, the BT module 925, the GPS module 927, and the NFC module 928 are illustrated as blocks separated from each other, but at least some (for example, two or more) of the cellular module 921, the WiFi module 923, the BT module 925, the GPS module 927, and the NFC module 928 may be included in one Integrated Circuit or Chip (IC) or one IC package. For example, at least some (for example, a communication processor corresponding to the cellular module 921 and a Wi-Fi processor corresponding to the Wi-Fi module 923) of the processors corresponding to the cellular module 921, the Wi-Fi module 923, the BT module 925, the GPS module 927, and the NFC module 928, respectively, may be implemented by a single SoC.

The RF module 929 transmits/receives data, for example, an RF signal. Although not illustrated, the RF module 929 includes, for example, a transceiver, a Power Amp Module (PAM), a frequency filter, a Low Noise Amplifier (LNA) and the like. Further, the RF module 929 further includes a component, such as a conductor, a conductive wire or the like, for transmitting/receiving an electromagnetic wave in free space in wireless communication. Although the cellular module 921, the Wi-Fi module 923, the BT module 925, the GPS module 927, and the NFC module 928 are illustrated as sharing one RF module 929 in FIG. 10, at least one of the cellular module 921, the Wi-Fi module 923, the BT module 925, the GPS module 927, and the NFC module 928 may transmit/receive the RF signal via a separate RF module.

According to an embodiment of the present invention, the electronic device 901 is connected to the companion device (for example, the electronic device 104) via the Wi-Fi module 923, the BT module 925, or the NFC module 928. Further, the electronic device 901 accesses the BS (for example, the server 106) via the cellular module 921 and is connected to the host device (for example, the electronic device 101) via the BS.

The SIM card 924 is a card including a subscriber identification module, and is inserted into a slot formed in a portion of the electronic device 901. The SIM card 924 includes identification information (for example, Integrated Circuit Card IDentifier (ICCID)) or subscriber information (for example, International Mobile Subscriber Identity (IMSI) information).

The memory 930 (for example, the memory 130 or the memory 630) includes an internal memory 932 or an external memory 934. The internal memory 932 includes at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like).

According to an embodiment of the present invention, the internal memory 932 is a Solid State Drive (SSD). The external memory 934 may further include a flash drive, for example, a Compact Flash (CF), a Secure Digital (SD) memory card, a Micro Secure Digital (Micro-SD) memory card, a Mini Secure Digital (Mini-SD) memory card, an extreme Digital (xD) memory card, a memory stick, or the like. The external memory 934 is functionally connected to the electronic device 901 via various interfaces. According to an embodiment of the present invention, the electronic device 901 may further include a storage device (or storage medium) such as a hard drive.

The sensor module 940 measures a physical quantity or detects an operation state of the electronic device 901, and converts the measured or detected information to an electronic signal. The sensor module 940 includes, for example, at least one of a gesture sensor 940A, a gyro sensor 940B, an barometer sensor 940C, a magnetic sensor 940D, an acceleration sensor 940E, a grip sensor 940F, a proximity sensor 940G, a color sensor 940H (for example, Red, Green, and Blue (RGB) sensor), a biometric sensor 940I, a temperature/humidity sensor 940J, an illuminance sensor 940K, and an Ultra Violet (UV) light sensor 940M. Additionally or alternatively, the sensor module 940 includes, for example, an E-nose sensor, an ElectroMyoGraphy (EMG) sensor, an ElectroEncephaloGram (EEG) sensor, an ElectroCardioGram (ECG) sensor, an InfraRed (IR) sensor, an iris sensor, a fingerprint sensor and the like. The sensor module 940 further includes a control circuit for controlling one or more sensors included therein.

The input module 950 includes a touch panel 952, a (digital) pen sensor 954, a key 956, or an ultrasonic input device 958. The touch panel 952 recognizes a touch input via at least one of, for example, a capacitive type, a resistive type, an infrared type, and an acoustic wave type. The touch panel 952 further includes a control circuit. The capacitive type touch panel recognizes physical contact or proximity.

The touch panel 952 further includes a tactile layer. In this case, the touch panel 952 may provide a tactile reaction to a user.

The (digital) pen sensor 954 is implemented, for example, using a method identical or similar to a method of receiving a touch input of a user, or using a separate recognition sheet. The key 956 includes, for example, a physical button, an optical key or a keypad. The ultrasonic input device 958 detects an acoustic wave by a microphone (for example, a microphone 988) of the electronic device 901 via an input tool generating an ultrasonic signal to identify data, and performs wireless recognition. According to an embodiment of the present invention, the electronic device 901 receives a user input from an external device (for example, a computer or a server) connected thereto, using the communication module 920.

The display 960 (for example, the display 150 or the display 650) includes a panel 962, a hologram device 964, or a projector 966. The panel 962 may be, for example, a Liquid Crystal Display (LCD), an Active-Matrix Organic Light Emitting Diode (AM-OLED), or the like. The panel 962 may be implemented to be, for example, flexible, transparent, or wearable. The panel 962 may be also configured as one module together with the touch panel 952. The hologram device 964 projects a stereoscopic image in the air by using interference of light. The projector 966 projects light onto a screen to display an image. For example, the screen may be located inside or outside of the electronic device 901. According to an embodiment of the present invention, the display 960 further includes a control circuit for controlling the panel 962, the hologram device 964, or the projector 966.

The interface 970 includes, for example, a High-Definition Multimedia Interface (HDMI) 872, a Universal Serial Bus (USB) 974, an optical interface 976, or a D-subminiature (D-sub) connector 978. The interface 970 may be included in, for example, the communication module 160 illustrated in FIG. 1 or the communication module 660 illustrated in FIG. 6. Additionally or alternatively, the interface 970 includes, for example, a Mobile High-definition Link (MHL) interface, a Secure Digital (SD) card/Multi-Media Card (MMC) interface, or an Infrared Data Association (IrDA) standard interface.

The audio module 980 bidirectionally converts between a sound and an electronic signal. At least some components of the audio module 980 may be included in, for example, the input/output interface 140 illustrated in FIG. 1 or the input/output interface 640 illustrated in FIG. 6. The audio module 980 processes voice information input or output via, for example, a speaker 982, a receiver 984, an earphone 986, a microphone 988 or the like.

The camera module 991 is a device which photographs a still image and a video. According to an embodiment of the present invention, the camera module 291 includes one or more image sensors (for example, a front sensor or a rear sensor), a lens, an Image Signal Processor (ISP) or a flash (for example, a Light Emitting Diode (LED) or a xenon lamp).

The power management module 995 manages power of the electronic device 901. Although not illustrated, the power management module 995 includes, for example, a Power Management Integrated Circuit (PMIC), a charger Integrated Circuit (IC), and a battery or fuel gauge.

The PMIC may be mounted to, for example, an integrated circuit or a SoC semiconductor. Charging methods are classified into a wired charging method and a wireless charging method. The charger IC charges a battery and prevents over voltage or over current from flowing from a charger. According to an embodiment of the present invention, the charger IC includes a charger IC for at least one of the wired charging method and the wireless charging method. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like may be added.

The battery gauge measures, for example, the remaining amount of electrical power in the battery 996, a charging voltage and current, or a temperature. The battery 996 stores or generates electricity, and supplies electrical power to the electronic device 901 using the stored or generated electricity. The battery 996 includes, for example, a rechargeable battery or a solar battery.

The indicator 997 displays a status of the electronic device 901 or a part thereof (for example, the AP 810), for example, a booting status, a message status, a charging status, or the like. The motor 998 converts an electrical signal to a mechanical vibration. Although not illustrated, the electronic device 901 may include a processing unit (for example, a GPU) for supporting a mobile TV function. The processing unit for supporting the mobile TV processes, for example, media data according to a standard of a Digital Multimedia Broadcasting (DMB), a Digital Video Broadcasting (DVB), a media flow or the like.

The above described components of the electronic device according to an embodiment of the present invention may be formed of one or more components, and a name of a corresponding component element may be changed based on the type of electronic device. The electronic device according to an embodiment of the present invention may be formed to include at least one of the above described components, and some of the components may be omitted or additional components may be further included. Further, some of the components of the electronic device according to an embodiment of the present invention may be combined to form a single entity, and thus, may equivalently execute functions of the corresponding elements prior to the combination.

Figure 11:
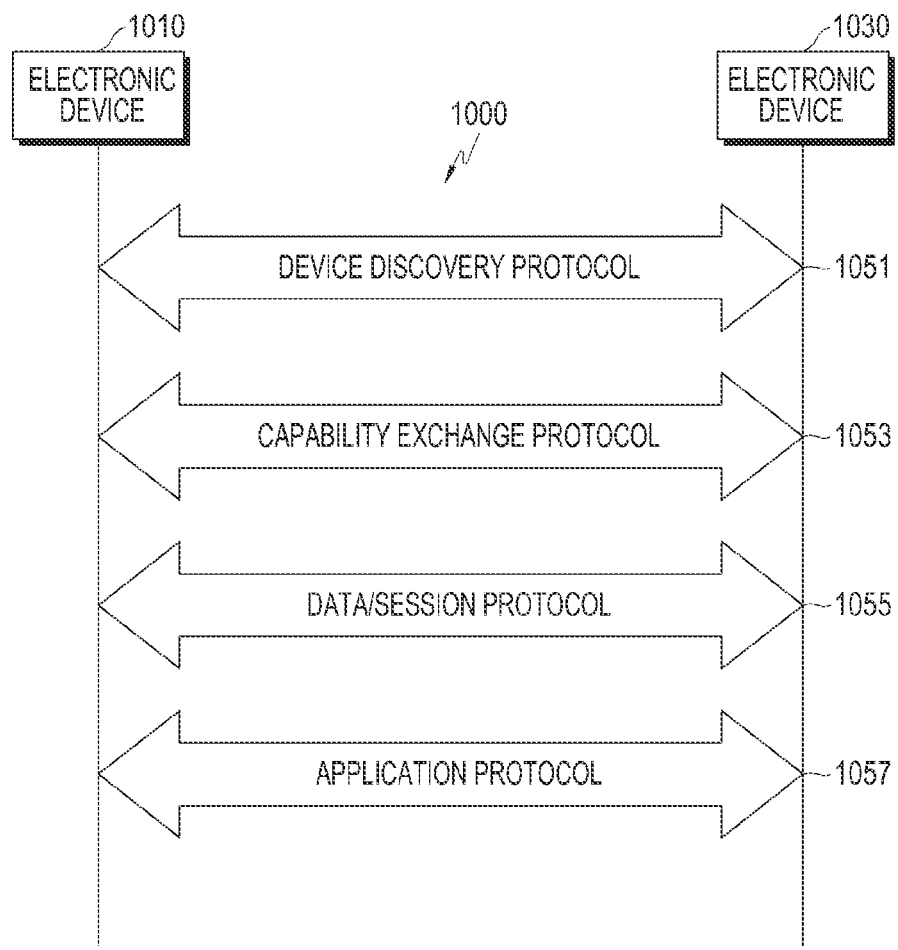
FIG. 11 illustrates communication protocols among a plurality of electronic devices according to an embodiment of the present invention.

FIG. 11 illustrates a communication protocol 1000 between a plurality of electronic devices (for example, an electronic device 1010 and another electronic device 1030) according to an embodiment of the present invention. Referring to FIG. 11, for example, the communication protocol 1000 includes a device discovery protocol 1051, a capability exchange protocol 1053, a data/session protocol 1055, and an application protocol 1057.

According to an embodiment of the present invention, the device discovery protocol 1051 is a protocol that allows the electronic devices (for example, the electronic device 1010 or the another electronic device 1030) to detect an external electronic device which can be connected thereto or connect the found external electronic device thereto. For example, the electronic device 1010 (for example, the electronic device 101) may detect, as a device which can communicate with the electronic device 1010, the electronic device 1030 (for example, the electronic device 104) by using the device discovery protocol 1051 via a communication method (for example, Wi-Fi, BT, USB, or the like) which can be used by the electronic device 1010. For establishing a communication connection with the electronic device 1030, the electronic device 1010 acquires identification information of the electronic device 1030 detected via the device discovery protocol 1051 and stores the acquired identification information. For example, the electronic device 1010 may establish the communication connection with the electronic device 1030 at least based on the identification information.

According to an embodiment of the present invention, the device discovery protocol 1051 is a protocol for mutual authentication among a plurality of electronic devices. For example, the electronic device 910 performs an authentication between the electronic device 1010 and the another electronic device 1030 based on communication information (for example, a Media Access Control (MAC) address, a Universally Unique IDentifier (UUID), a SubSystem IDentification (SSID), and an Internet Protocol (IP) address) for the connection with the another electronic device 1030.

According to an embodiment of the present invention, the capability exchange protocol 1053 is a protocol for exchanging information related to a service function which is supported by at least one of the electronic device 1010 and the another electronic device 1030. For example, the electronic device 1010 or the another electronic device 1030 may exchange information related to a service function currently provided by each of the electronic device 1010 and the another electronic device 1030 via the capability exchange protocol 1053. The exchangeable information may include identification information indicating a service among a plurality of services which can be supported by the electronic device 1010 or the another electronic device 1030. For example, the electronic device 1010 may receive, from the electronic device 1030, identification information of a service provided by the another electronic device 1030 via the capability exchange protocol 1053. In this case, the electronic device 1010 determines whether the service can be supported by the electronic device 1010 based on the received identification information.

According to an embodiment of the present invention, the data/session protocol 1055 is a protocol for controlling flows of data which are transmitted/received to provide a service linked between the electronic devices (for example, the electronic device 1010 and the another electronic device 1030) which are connected to communicate with each other. For example, at least one of the electronic device 1010 and the another electronic device 1030 controls an error or data quality by using the data/session protocol 1055. Additionally or alternatively, the data/session protocol 1055 determines a transport format of the data transmitted/received between the electronic device 1010 and the another electronic device 1030. Further, at least one of the electronic device 1010 and the another electronic device 1030 at least manage a session (for example, a session connection or a session termination) for a data exchange between the electronic devices using the data/session protocol 1055.

According to an embodiment of the present invention, the application protocol 1057 is a protocol for providing a process or information for exchanging data related to a service provided to an external electronic device. For example, the electronic device 1010 (for example, the electronic device 101 or the electronic device 104) may provide a service to the another electronic device 1030 (for example, the electronic device 104 or the server 106) via the application protocol 1057.

According to an embodiment of the present invention, the communication protocol 1000 includes a standard communication protocol, a communication protocol designated by an individual or organization (for example, a communication protocol self-designated by a communication device manufacturing company or a network supplying company) or a combination thereof.

"Module" used in an embodiment of the present invention may refer to, for example, a "unit" including one of hardware, software, and firmware, or a combination of two or more of the hardware, software, and firmware. "Module" may be interchangeably used with a term, such as unit, logic, logical block, component, or circuit. "Module" may be the smallest unit of an integrated component or a part thereof. "Module" may be the smallest unit that performs one or more functions or a part thereof. "Module" may be mechanically or electronically implemented. For example, "module" according to an embodiment of the present invention may include at least one of an Application-Specific Integrated Circuit (ASIC) chip, a Field-Programmable Gate Arrays (FPGAs), and a programmable-logic device for performing operations which are known or are developed hereafter.

According to an embodiment of the present invention, at least a part of a device (for example, modules or functions thereof) or a method (for example, operations) may be embodied by, for example, a command stored in a non-transitory computer readable storage medium in a form of a programming module. When the instructions are executed by one or more processors (e.g., the one or more processors 120), the one or more processors perform functions corresponding to the instructions. The non-transitory computer-readable storage medium may be, for example, the memory 130. At least some of the programming modules may be implemented (for example, executed) by, for example, the processor 120. At least a part of the programming module may include, for example, a module, a program, a routine, a set of instructions and/or a process for performing one or more functions.

The non-transitory computer readable recording medium may include magnetic media such as a hard disc, a floppy disc, and a magnetic tape, optical media such as a Compact Disc Read Only Memory (CD-ROM) and a Digital Versatile Disc (DVD), magneto-optical media such as a floptical disk, and hardware devices specifically configured to store and execute program commands, such as a Read Only Memory (ROM), a Random Access Memory (RAM), and a flash memory. In addition, the program instructions may include high level language instructions, which can be executed on a computer using an interpreter, as well as machine code generated by a compiler. The aforementioned hardware device may be configured to operate as one or more software modules in order to perform the operation of an embodiment of the present invention, and vice versa.

A module or a programming module according to the present invention may include at least one of the described component elements, a few of the component elements may be omitted, or additional component elements may be included. Operations executed by a module, a programming module, or other component elements according to an embodiment of the present invention may be executed sequentially, in parallel, repeatedly, or in a heuristic manner. Furthermore, some operations may be executed in a different order or may be omitted, or other operations may be added.

According to an embodiment of the present invention, a storage medium storing commands is configured to allow one or more processors to perform one or more operations when the commands are executed by the one or more processors. The one or more operations may include, by a first electronic device, transmitting a pre-stored BS list to a second electronic device connected via short-range communication; determining whether a preset time lapses from the transmission of the BS list; updating the BS list when the preset time lapses; and transmitting the updated BS list to the second electronic device. Further, the one or more operations may include, by the first electronic device, transmitting a pre-stored BS list to a second electronic device connected via short-range communication; determining whether a BS connected via Wide Area Network (WAN) communication is changed after the transmission of the BS list; updating the BS list when the BS connected via the WAN communication is changed; and transmitting the updated BS list to the second electronic device. In addition, the one or more operations may include, by the first electronic device, receiving a BS list from a second electronic device when a connection with the second electronic device is configured via short-range communication; determining whether a preset time lapses from the reception of the BS list; making a request for the BS list to the second electronic device when the preset time lapses; and re-receiving the BS list from the second electronic device.

The embodiments of the present invention disclosed in the specification and the drawings are only examples proposed in order to easily describe the technical matters of the present invention and help with comprehension of the present invention, and do not limit the scope of the present invention. Therefore, in addition to the embodiments disclosed herein, the scope of the present invention should be construed to include all modifications or modified forms drawn based on the technical idea of the various embodiments of the present invention, as defined by the appended claims and their equivalents.

What is claimed is:

1. A method for managing a Base Station (BS) list by a first electronic device, the method comprising:
   generating the BS list including information about BSs capable of being connected with the first electronic device;
   generating a message including the BS list and a control signal, for connection between a second electronic device and one of the BSs when a short-range communication connection between the first electronic device and the second electronic device is terminated;
   transmitting the message including the BS list and the control signal to the second electronic device via the short-range communication connection;
   determining whether a Received Signal Strength Indicator (RSSI) of a signal transmitted from the second electronic device is less than a reference value;
   updating the BS list when the RSSI is less than the reference value; and
   transmitting a message including the updated BS list and the control signal to the second electronic device.

2. The method of claim 1, further comprising:
   when a BS connected with the first electronic device changes, updating the BS list by reflecting the change of the BS in the BS list.

3. The method of claim 2, further comprising:
   transmitting a message including the updated BS list and the control signal to the second electronic device.

4. The method of claim 1, further comprising:
   when a BS connected with the first electronic device does not change, maintaining the BS list.

5. The method of claim 4, further comprising:
   re-transmitting the message including the BS list and the control signal to the second electronic device.

6. The method of claim 1, wherein updating the BS list comprises:
   when the BS connected with the first electronic device changes in response to a movement of the first electronic device, updating the BS list by reflecting the change of a position in the BS list.

7. A first electronic device for managing a Base Station (BS) list, the first electronic device comprising:
   a communication interface; and
   a processor configured to:
   generate the BS list including information about BSs capable of being connected with the first electronic device,
   generate a first message including the BS list and a control signal, for connection between a second electronic device and one of the BSs when a short-range communication connection between the first electronic device and the second electronic device is terminated,
   control the communication interface to transmit the first message including the BS list and the control signal to the second device via the short-range communication connection,
   determine whether a Received Signal Strength Indicator (RSSI) of a signal transmitted from the second electronic device is less than a reference value,
   update the BS list when the RSSI is less than the reference value, and
   control the communication interface to transmit a message including the updated BS list and the control signal to the second electronic device.

8. The first electronic device of claim 7, wherein the processor is further configured to:
   when a BS connected with the first electronic device changes, update the BS list by reflecting the change of BS in the BS list, and
   control the communication interface to transmit a message including the updated BS list and the control signal.

9. The first electronic device of claim 7, wherein the processor is further configured to:
   when a BS connected with the first electronic device does not change, maintain the BS list, and
   control the communication interface to re-transmit the message including the BS list and the control signal to the second electronic device.

10. The first electronic device of claim 7, wherein the processor is further configured to:
    determine whether a preset time lapses from the transmission of the message including the BS list and the control signal,
    update the BS list when the preset time lapses, and
    transmit a message including the updated BS list and the control signal to the second electronic device.

* * * * *